United States Patent [19]
Buchscheidt

[11] 3,947,307
[45] Mar. 30, 1976

[54] APPARATUS FOR FLUID-TIGHT WELDING OF A CLOSABLE CONNECTING PIECE INTO A THIN-WALLED CONTAINER

[75] Inventor: Kurt Buchscheidt, Ettlingen, Baden, Germany

[73] Assignee: Elbatainer Kunststoff-und Verpackungsgesellschaft mit beschrankter Haftung, Ettlingen, Baden, Germany

[22] Filed: July 29, 1974

[21] Appl. No.: 492,924

[30] Foreign Application Priority Data
Aug. 1, 1973  Germany............................ 2338908

[52] U.S. Cl. ................... 156/73.1; 156/580; 228/1; 264/69
[51] Int. Cl.² ........................................... B32B 5/18
[58] Field of Search .......... 29/470.3; 228/1; 264/69; 156/73.1, 583, 580, 73.1

[56] References Cited
UNITED STATES PATENTS

| | | | |
|---|---|---|---|
| 3,464,102 | 9/1969 | Soloff................................. | 156/580 |
| 3,483,066 | 12/1969 | Harris et al........................ | 156/580 |
| 3,602,257 | 8/1971 | Beryleyoung et al............. | 156/73.1 |
| 3,700,532 | 10/1972 | Pierson............................... | 156/580 |
| 3,713,956 | 1/1973 | Cospen............................... | 156/580 |

*Primary Examiner*—Edward G. Whitby
*Attorney, Agent, or Firm*—Ernest G. Montague; Karl F. Ross; Herbert Dubno

[57] ABSTRACT

The invention relates to an ultrasonic welding, apparatus for a flexible fluid container fabricated of synthetic thermoplastic material having a welding surface, thin walls and a rim, and closed but for a single opening for fluid-tight welding of the connecting piece into the container, which is also fabricated of synthetic thermoplastic material. A welding ring focusses the ultrasonic energy to the welding surfaces. A ring-shaped base terminates the connecting piece.

5 Claims, 4 Drawing Figures

APPARATUS FOR FLUID-TIGHT WELDING OF A CLOSABLE CONNECTING PIECE INTO A THIN-WALLED CONTAINER

FIELD OF THE INVENTION

The invention relates to an apparatus for fluid-tight welding of a closable connecting piece into an opening of a thin-walled, flexible fluid container, closed except for this opening and fabricated of synthetic thermoplastic material.

BACKGROUND OF THE INVENTION

Containers of the aforementioned type serve as inner containers of so-called dual-material fluid receptacles having an outer cover and can be made of a soft thermoplastic material, such as polyethylene; it is then required that a molded and threaded fluid-tight connecting piece, fabricated of a relatively thick-walled and stable material, can be inserted into the opening of the flexible container and coupled with the latter's thin wall firmly and in a fluid-tight fashion so that transportation or other manipulation of that assembly do not destroy that connection or cause it to leak.

It is known to form a flexible container out of a plasticized foil made of synthetic resin by a blowing or vacuum process and to subsequently attach a relatively thick-walled and stable pre-fabricated connecting piece into that opening by means of clamps. The connecting piece is then provided on its base with an attachment flange which, upon insertion into the opening of that container, grips the rim of that opening from the interiors, a clamping ring exerting counter-pressure from the exterior and snapping over a bulge of the connecting piece pushing the rim of the container into a circular recess of the attachment flange—see German Patent 1,249,718. In order to obtain an adequate degree of sealing at the point of attachment such purely mechanically functioning attachment pieces were required to fit into each other very firmly, which in turn led to frequent breakage and damage of these pieces during the attachment process. Furthermore, such packaging required considerable preparation and manual labor and did not guarantee sealing effectiveness or durability.

To obviate such disadvantages many experiments have been undertaken to weld the thin container wall to the attachment flange of the connecting piece either by heat treatment or ultrasonically. Numerous difficulties were encountered, partly due to the unfavorable properties of the soft plastic, and partly due to the impossibility of obtaining a sufficiently isolating counterpressure from the inside of the container. The closed bottom of the container did not permit any access from its underside, so that the connecting piece made contact with the bottom during the welding process and was welded thereto by a so-called remote welding effect. The resultant considerable thickening of the attachment flange turned out to be disadvantageous because the material of the thin-walled container was considerably changed in structure in the bottom region of the container as well as in the supporting region of the connecting piece during welding. This lack of homogeneity of the container material within the attachment region and the container bottom led to stress and failure during transportation or due to falls, or as a result of corrosive liquids used for filling the containers. Thus methods used to date for welding synthetic resin appeared inapplicable. It also was not possible to make use only of the general teachings of manufacturers of ultrasonic welding devices, which provide the parts to be welded with an energy-focusing device projecting from one of the connecting surfaces since the problem of welding thin-walled or foil-like closed containers to thick-walled containers or closure parts had not been dealt with in any of these proposals.

OBJECTS OF THE INVENTION

It is accordingly an object of my invention to obviate the aforesaid disadvantages causing a large number of rejects during mass production of these packages.

SUMMARY OF THE INVENTION

My invention deals with an ultrasonic welding apparatus for a flexible fluid-container fabricated of synthetic thermoplastic material having a welding surface, thin walls and a rim, and closed except for a single opening for fluid-tight welding of the connecting piece into the container. The connecting piece is also fabricated of synthetic thermoplastic material, fits into the opening and is provided with another welding surface. At least one welding ring forming a closed annulus around part of the connecting piece projects from the latter's welding surface for directing ultrasonic energy upon the welding surfaces, the ring having a volume not exceeding that of the wall segment within its region during the welding process. A ring-shaped attachment flange projects from the welding surface of the connecting piece, whose height is at least equal to ten times the width of the wall of the container and projects into the interior of the latter. Upon insertion of the connecting piece into the opening, the welding surface of the former being located below the rim of the container, both welding surfaces are brought into contact with each other, and ultrasonic energy is caused to impinge on the latter, fusing the welding ring into the rim of the container; the ultrasonic energy diminishing gradually beyond the region of the contact of the welding surfaces. An ultrasonic wave-generating head formed with a recess on the side facing the welding surfaces and having a freely vibratable top side formed with a closed, ring-shaped and flat welding surface and an outwardly inclined rim is used as a source of ultrasonic energy. The container and its inserted connecting piece rest on an anvil carrying a central ring-shaped insert having a substantially concave surface. The anvil is divided into an upper and a lower portion separated from each other by a gap, a sphere being embedded in the lower portion and a recess provided in the upper portion for accomodating the top portion of the sphere, the former being able to tilt about the latter to a limited extent. In a preferred version of the invention a second welding ring is provided which is substantially similar to the first welding ring except for a different diameter, each welding ring having a substantially triangular cross-section and a height and width substantially equal to the wall thickness of the container.

As a result of the ring-shaped contact of the ultrasonic head with thin-walled container and the focusing of the ultrasonic energy upon the welding surfaces by means of the welding rings, welding is accomplished in an extremely short time yielding a very homogenous welding connection. The connecting piece itself can be fabricated using larger tolerances than those of previous mechanical attachment methods, which need therefore no longer be employed. The extremely short welding time and the homogeneous welding connection are obviously due to the use of materials of identical molecular structure, as well as a correct proportioning of the mass of the connecting piece in relation to the thin walls of the container, the properly focused ultrasonic energy achieving a weld between the contacting surfaces, leaving the upper surface region of the container substantially undisturbed.

The intensity of the ultrasonic oscillations diminishes below the welding surfaces and is largely absorbed by the thick-walled connecting piece, so that no remote welding effect occurs between the attachment flange of the connected piece and the bottom of the container. The dimensioning of the inclined rim of the ultrasonic head further assures a reduction of intensity of the ultrasonic energy beyond the region of the welding surfaces, thus avoiding a step-wise and consequently easily breakable transition from the welding region to the thin wall of the container.

The insert projecting from the anvil permits at most a contact of the thin-walled bottom of the container along substantially a line, or even along only some points, since the bottom is free to vibrate; this structure avoids the disadvantage of a surface contact of the container's bottom with the anvil, which could easily damage or even puncture the thin-walled bottom of the container. An insert of variable size permits the use of connecting pieces of differing sizes, the dimensions of the insert being tailored to those of the connecting piece.

Differences in pressure, due to possible variations in thickness of the parts to be welded are equalized by the upper portion of the anvil being able to tilt about a sphere embedded in the anvil's lower portion; this arrangement ensures an equal distribution of pressure exerted by the ultrasonic head on every portion of the welding surfaces.

BRIEF DESCRIPTION OF THE DRAWING

These, and other features of my invention will be better understood from the accompanying drawing, in which.

SPECIFIC DESCRIPTION

Figure 1:
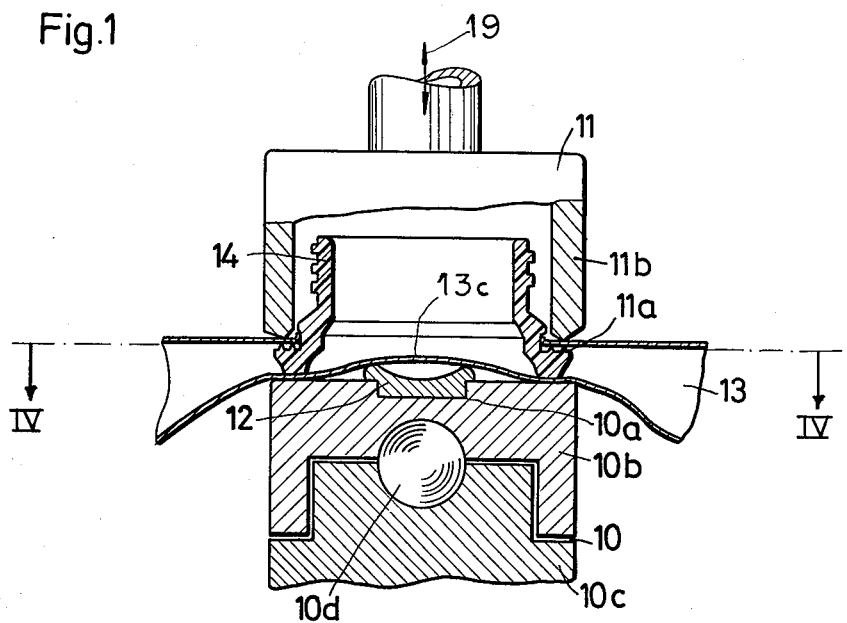
FIG. 1 shows a fragmentary elevational cross-section of the ultrasonic welding arrangement, including the ultrasonic head and the thin-walled container with the inserted connecting piece.

FIG. 1 shows an ultrasonic welding arrangement known per se with an anvil 10 for the acceptance of parts to be welded, and a fragmentary cross-section of an ultrasonic head 11, also termed a sonotrode, movable along a vertical axis 19 and formed as a pot-shaped hollow cylinder. The latter's lower counter-pressure surface 11a facing anvil 10 is formed as a closed ring and serves as a welding surface. This surface is inclined upwards towards the periphery of ultrasonic head 11. Anvil 10 is formed with a recess 10a along vertical axis 19 for accepting a disk-shaped insert 12 formed with a projection and having a substantially concave inner surface. Insert 12 is exchangeable and rests in an upper portion 10b of the anvil, which is supported by a sphere 10d embedded in a lower portion 10c of anvil 10, there being a small gap between upper anvil-portion 10b and lower anvil-portion 10c, so that the former can tilt to a limited extent about sphere 10d.

Figure 2:
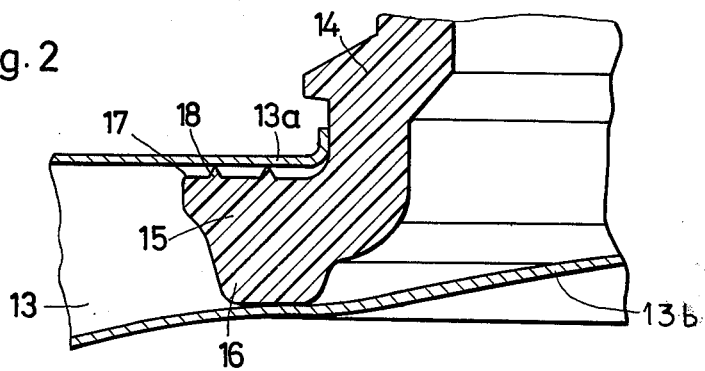
FIG. 2 shows an enlargement of part of FIG. 1 without the ultrasonic head prior to ultrasonic welding.

A flexible container 13, shown only in fragmentary fashion, rests on anvil 10 and is made of a high-pressure polyethylene foil of about 0.4 mm thickness in the form of a bag. An approximately tubular connecting piece 14 fabricated by injection molding of high pressure polyethylene and having a wall thickness of about 2 to 4 mm is threaded on its upper portion to receive a cap not shown in FIG. 1 having a corresponding inner thread and rests in a circularly-shaped opening of container 13. As shown more clearly in the enlargements of FIGS. 2 and 3, this connecting piece terminates in a closed ring-formed flange 15 projecting radially outwards and a supporting a base 16 projecting in a direction parallel to vertical axis 19.

A container rim 13a enveloping the opening of container 13 abuts an attachment flange 15 of connecting piece 14, base 16 of the latter having been inserted into the opening of container 13. This flange is formed on the side facing container 13 with a substantially flat contact surface 17. Two closed ring-shaped welding rings 18 spaced from each other and encompassing the core of connecting piece 14 project therefrom and serve to channel energy in a given direction; they are completely plastified under the influence of ultrasonic sound and serve to form a welding joint.

The cross-section of welding rings 18 is triangular, the apex of the triangle pointing outward, i.e. towards rim 13a of container 13. The height and width of the base of welding rings 18 are each approximately equal to the foil thickness of rim 13a of container 13, i.e. are each dimensioned to be about 0.4 mm. Flange 15 and its base 16 have a height measured along vertical axis 19 equal to about 4 mm, which is greater by an order of about 10 than the foil thickness of the wall of container 13.

Only two additional operations are necessary for a description of the packaging of containers 13, the latter being fabricated in a large volume from synthetic-plastic foil in a closed form with the exception of a circular opening: insertion of the connecting piece into the opening of container 13 and the start of the welding process. As has been illustrated in FIG. 2, rim 13a of container 13 merely rests on welding rings 18 of connecting piece 14 prior to this welding process; subsequently ultrasonic head 11 comes down, until its welding surface 11a abuts rim 13a, thereby compressing welding rings 18 of flange 15. A high-frequency generator, not shown in the drawing, also feeds energy to ultrasonic head 11 to generate ultrasonic oscillations focused into an annular shape. The former impinge even at low intensity in less than one second upon the respective contact surfaces formed of rim 13a, flange 15 and welding rings 18, the resulting vibration and generation of heat causing a plastification of welding rings 18 and surfaces bordering the latter, a homogeneous weld resulting therefrom. The energy of ultrasonic oscillations impinging on the outer border of the ring-shaped welding region is gradually reduced by the inclined shape of rim 11b of ultrasonic head 11. The resultant diminished energy prevents the thin foil of container 13 from having easily breakable brittle transitions near the welding region.

Figure 3:
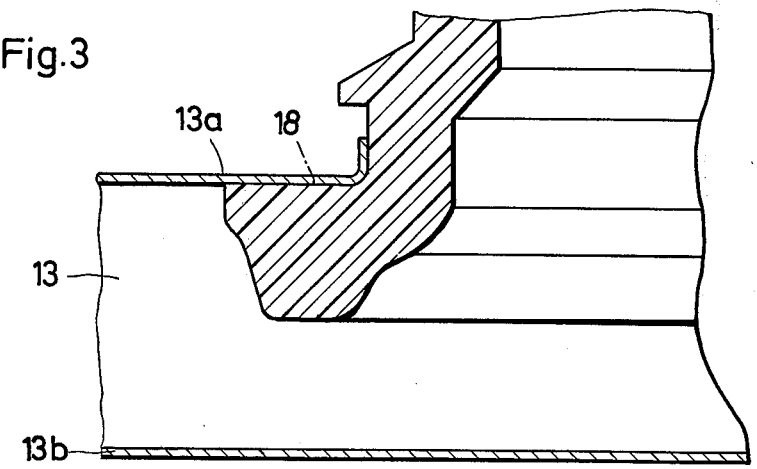
FIG. 3 shows an arrangement corresponding to FIG. 2 on completion of the ultrasonic welding.
Figure 4:
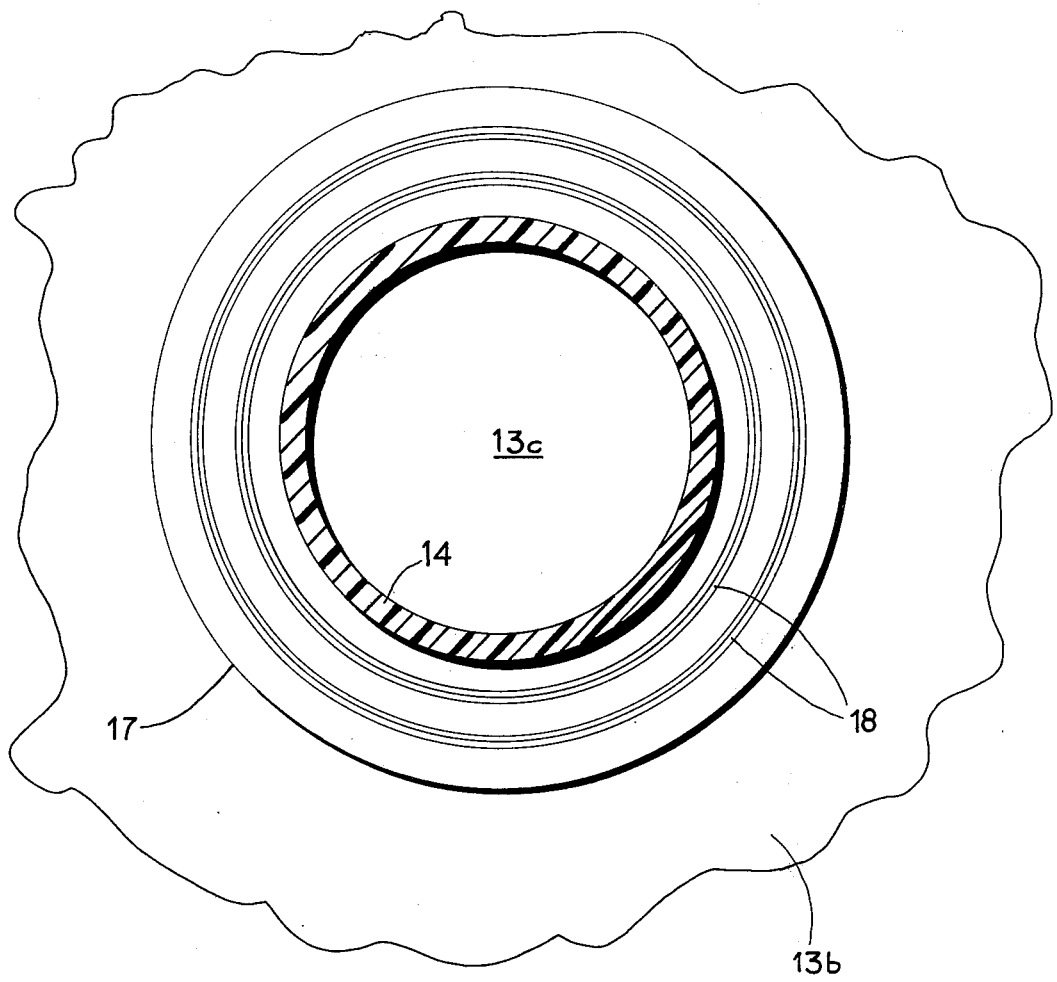
FIG. 4 shows a section of FIG. 1 along line IV — IV.

As illustrated in FIG. 3, the molecular masses of the contact regions, including that of plastified welding rings 18 flow homogenously into one another, the molecular structure of the outer foil of the container and the remainder of the connecting piece remaining unchanged. The intensity of the ultrasonic energy decreases significantly as a result of its absorption below its region of maximum intensity, i.e. below the welding region. The energy is primarily absorbed by the soft plastic material of relatively thick base 16, i.e. by the connecting piece itself, so that the latter, which abuts bottom 13b of container 13, does not become attached thereto.

A segment 13c of container 13 disposed within the hollow region of base 16 of connecting piece 14, which is also exposed to ultrasonic energy, is free to vibrate and kept substantially away from the supporting surfaces of anvil 10 by the ring-shaped projection of insert 12. The diameter of that ring-formed projection is dependent on the diameter of the connecting piece and the shape of ultrasonic head 11. Any undesired ultrasonic energy is therefore absorbed in any case by vibratingly yieldably segment 13c of the floor of container 13.

I claim:
1. In a process for fabricating a container having a closable fitting, the improvement which comprises in combination:
 a. forming a container body with a relatively thin wall from a thermoplastic synthetic-resin material and an opening in the wall;
 b. introducing into said opening the neck of a tubular connecting piece having an annular flange substantially thicker than said wall and composed of thermoplastic synthetic-resin material, said flange being formed with an annular ridge engaging the interior of said wall around said opening;
 c. pressing an annular ultrasonic welding tube against said wall directly opposite said ridge and supporting said container through an opposite wall thereof directly against said piece with an ultrasonic welding anvil;
 d. applying ultrasonic welding energy to said tool thereby fusing the first-mentioned wall to said ridge and said flange; and
 e. applying pressure between said tool and said anvil during the application of ultrasonic energy to cause said first-mentioned wall to bond to said flange and flatten said ridge.

2. An apparatus for welding a tubular thermoplastic synthetic-resin connecting piece having an annuular flange to a wall of a flexible thermoplastic synthetic-resin container having an opening receiving said connecting piece, the wall of said container being substantially thinner than said flange, said apparatus comprising:
 a. an annular ultrasonic welding tool engageable with said wall around said connecting piece from the exterior of said container, said tool having an edge portion of limited area adapted to bear against said wall;
 b. an anvil adapted to support said connecting piece by engagement with an opposite wall of said container, said anvil being aligned with said tool;
 c. means for displacing one of said tool and said anvil relative to the other to press the first-mentioned wall against said flange and said flange against said opposite wall and said anvil, ultrasonic energy to be applicable to said tool to weld the first-mentioned wall to said flange; and
 d. an insert received in said anvil in axial alignment with said tool but inwardly of said edge portion thereof for lifting said other wall from said anvil inwardly of said flange.

3. The apparatus defined in claim 2, further comprising a support for said anvil, and a sphere interposed between said support and said anvil enabling tilting of said anvil.

4. The apparatus defined in claim 2 wherein said insert is concave in the direction of said tool.

5. An apparatus for welding a tubular thermoplastic synthetic-resin connecting piece having an annular flange to a wall of a flexible thermoplastic synthetic-resin container having an opening receiving said connecting piece, the wall of said container being substantially thinner than said flange, said apparatus comprising:
 a. an annular ultrasonic welding tool engageable with said wall around said connecting piece from the exterior of said container, said tool having an edge portion of limited area adapted to bear against said wall;
 b. an anvil adapted to support said connecting piece by engagement with an opposite wall of said container, said anvil being aligned with said tool;
 c. means for displacing one of said tool and said anvil relative to the other to press the first-mentioned wall against said flange and said flange against said opposite wall and said anvil, ultrasonic energy to be applicable to said tool to weld the first-mentioned wall to said flange;
 d. a support for said anvil axially aligned with said tool; and
 e. a sphere interposed between said support and said anvil and axially aligned with said tool for enabling tilting of said anvil relative to said support.

* * * * *